Patented Dec. 18, 1951

2,579,298

UNITED STATES PATENT OFFICE 2,579,298

CHLORINATED BORNYL CHLORIDE INSECTICIDAL COMPOSITION

George Allen Buntin, Wilmington, Del., assignor to Hercules Powder Company, Wilmington, Del., a corporation of Delaware No Drawing. Application April 8, 1948, Serial No. 19,867

8 Claims. (Cl. 167—30)

1

This invention relates to insecticidal compositions and more particularly to insecticidal compositions containing a highly chlorinated bornyl chloride as the toxic ingredient.

Among the more commonly used insecticidal toxicants are the naturally occurring products, pyrethrum, rotenone and nicotine. These natural products have the very great disadvantage of not being uniform in their insecticidal activity and thus make it difficult to formulate insecticidal compositions. Many synthetic products have been suggested in the past as substitutes for these toxicants; however, they are usually lacking in one respect or another. Either they do not have a high enough killing power and must be used in concentrations which cause irritation to the user, or, if they are sufficiently toxic, they are also toxic to forms of animal life other than insect pests.

Now in accordance with this invention, it has been found that insecticidal compositions, containing as the toxic ingredient a chlorinated bornyl chloride which has a chlorine content of from about 56% to about 74%, possess an unusual degree of insecticidal activity. Because of the very high killing power of a chlorinated bornyl chloride containing 56% to 74% chlorine, extremely dilute solutions of these toxicants are effective.

The following examples will illustrate the preparation and insecticidal activity of insecticidal compositions containing these chlorinated bornyl chlorides.

Example 1

One part of bornyl chloride (19.7% chlorine) dissolved in 4 parts of carbon tetrachloride was placed in a chlorination vessel and exposed to ultraviolet illumination. Chlorine was passed into the agitated mixture at a rate that allowed for maximum absorption of the chlorine. The temperature rose immediately, due to the heat of the reaction, to about 155° F. and was held at 150°–160° F. during the chlorination. Samples were removed at intervals during the chlorination, a total of 9 samples being removed. The carbon tetrachloride was removed from each of these samples by sparging with nitrogen at 100° C. The products were white, waxy solids.

The 9 chlorinated bornyl chlorides, of different chlorine content, were tested for their insecticidal activity against houseflies. The test for insecticidal activity against houseflies was made in the following manner and is referred to as the bell jar method.

2

Approximately 100 five-day old flies (Musca domestica) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analysis for chlorine content and of tests made on 0.5% solutions in deodorized kerosene of the above chlorinated bornyl chlorides are given in the following table. The data are an average of a series of tests made on each solution.

| Chlorination Time in Hrs. | Per Cent Chlorine | Per Cent Dead in 24 Hrs. | O. T. I. Difference |
|---|---|---|---|
| 7    | 55.9 | 54  | +6  |
| 8    | 58.4 | 86  | +38 |
| 9    | 60.6 | 98  | +50 |
| 9.5  | 63.0 | 100 | +52 |
| 10.5 | 65.9 | 99  | +51 |
| 12   | 68.9 | 100 | +52 |
| 15   | 71.0 | 100 | +52 |
| 22.5 | 72.9 | 94  | +46 |
| 39   | 74.5 | 40  | −8  |

Example 2

One part of bornyl chloride dissolved in 5 parts of carbon tetrachloride was placed in a chlorination vessel and exposed to ultraviolet illumination. Chlorine was passed into the agitated mixture and the solution refluxed from the heat of the reaction. One sample was taken after 8.5 hours of chlorination and a second sample after 10 hours of chlorination. The carbon tetrachloride was removed from each sample by distillation under reduced pressure. The material which remained was dissolved in petroleum ether and this solution was washed with a sodium bicarbonate solution and with water, dried and the solvent removed. The products were white, soft solids which were analyzed for their chlorine content. The results of testing 1% solutions of each of these chlorinated bornyl chlorides in deodorized kerosene for their insecticidal activity against houseflies by the bell jar method are given in the following table.

| Chlorination Time in Hrs. | Per Cent Chlorine | Per Cent Dead in 24 Hrs. | O. T. I. Difference |
|---|---|---|---|
| 8.5 | 57.6 | 98 | +46 |
| 10 | 65.9 | 100 | +48 |

*Example 3*

A chlorinated bornyl chloride containing 58.8% chlorine was tested for its insecticidal activity against mosquito larvae (*Aedes aegypti*). In carrying out this test an acetone solution of the toxicant was added to 100 ml. of tap water in a beaker in such a quantity as to give a dilution of 1 part of the toxicant in 200,000 parts of water. Ten to fifteen larvae were then introduced and the number of larvae dead at the end of 24 hours and the 24-hour mortality calculated in percent. Controls were run using tap water along and tap water containing the same amount of acetone as in the solution containing the toxicant. The results of this test are:

| Solution: | Percent kill, 24 hrs. |
|---|---|
| Tap water | 0 |
| Tap water+acetone | 3 |
| Tap water+acetone+chlorinated bornyl chloride | 100 |

*Example 4*

An insecticidal dust was prepared by dissolving a chlorinated bornyl chloride containing 68.9% chlorine in kerosene and spraying this solution onto fuller's earth in such proportions as to give a mixture containing 40% of the chlorinated bornyl chloride. This material was then ground and reduced with pyrophyllite to a dust containing 20% of the chlorinated bornyl chloride. This dust was tested for its insecticidal activity against cotton insects and was found to be very effective for controlling these insects.

The chlorinated bornyl chloride which is used as the toxic ingredient of the insecticidal compositions in accordance with this inventon should contain an amount of chlorine of from about 56% to about 74% and preferably from about 60% to about 72%. As may be seen from the foregoing examples, a chlorinated bornyl chloride having a chlorine content within these ranges has a very high insecticidal activity, a kill of approximately 100% being obtained within the more preferable range.

The bornyl chloride which is chlorinated to obtain the chlorinated bornyl chloride containing from about 56% to about 74% chlorine may readily be obtained by saturating either α- or β-pinene or any commercial source of a pinene, such as gum or wood turpentine or sulfate turpentine, with hydrogen chloride. Since the transition point at which pinene hydrochloride rearranges to bornyl chloride is about 20° C., the temperature should be kept above that point during the hydrogen chloride addition or the reaction mixture should be heated to above 20° C. after the addition reaction is complete. The resultant mixture may then be cooled and the crystals of bornyl chloride separated and chlorinated, or the crude mixture may be chlorinated directly. The chlorination of the bornyl chloride is more easily carried out in the presence of a solvent since it is a crystalline material. Suitable solvents for the chlorination are chloroform, carbon tetrachloride, pentachloroethane, etc. Chlorination catalysts may be used if desired, ultraviolet light being particularly efficient.

The insecticidal compositions of this invention may be made up of the chlorinated bornyl chloride admixed with any suitable type of diluent. If a liquid spray is desired, the chlorinated bornyl chloride may be dissolved in any convenient solvent, such as deodorized kerosene, or it may be dispersed in water to form an aqueous spray. Insecticidal dusts may be prepared by placing the chlorinated bornyl chloride on a diluent or carrier such as powdered carbon, kieselguhr, bentonite, pyrophyllite, etc.

For many purposes it may be desirable to use the chlorinated bornyl chloride in combination with other insecticidal toxicants. Many toxicants have a very high knockdown in relatively dilute solutions, but much higher concentrations must be used in order to obtain the desired degree of kill. Due to the very high degree of killing power which a chlorinated bornyl chloride containing about 56% to about 74% chlorine possesses, it may be added to such toxicants, thereby enabling the use of a much more dilute solution than would otherwise be possible in the finished insecticide. Toxicants with which the chlorinated bornyl chloride may be combined include such compounds as rotenone, pyrethrum, and organic thiocyanates such as alkyl thiocyanates, thiocyano ethers such as β-butoxy-β'-thiocyanoethyl ether, and terpene thiocyanoacylates such as isobornyl thiocyanoacetate, fenchyl thiocyanoacetate, and isobornyl α-thiocyanopropionate.

The very high insecticidal activity of a chlorinated bornyl chloride containing from about 56% to about 74% chlorine is illustrated by the foregoing examples. The amount of the chlorinated bornyl chloride to be admixed with the diluent depends upon the use to which the insecticidal composition will be put. For example, for use as a household spray, the chlorinated bornyl chloride is very effective at a concentration of 0.5% in deodorized kerosene, but when used as an agricultural dust a concentration of 10% to 20% or more may be desirable. The insecticidal compositions of this invention are useful in combatting flies, mosquitoes, roaches, moths, carpet beetles, bed bugs, and many other pests.

This application is a continuation-in-part of my application for United States Letters Patent Serial Number 609,027, filed August 4, 1945, now abandoned.

What I claim and desire to protect by Letters Patent is:

1. An insecticidal composition comprising the product obtained by chlorination of bornyl chloride with chlorine gas at an elevated temperature, below the temperature at which the product decomposes, to a chlorine content of from about 56% to about 74% chlorine and an insecticidal adjuvant as a carrier therefor.

2. An insecticidal composition comprising the product obtained by chlorination of bornyl chloride with chlorine gas at an elevated temperature, below the temperature at which the product decomposes, to a chlorine content of from about 60% to about 72% chlorine and an insecticidal adjuvant as a carrier therefor.

3. An insecticidal composition comprising the product obtained by chlorination of bornyl chloride with chlorine gas at an elevated temperature, below the temperature at which the product decomposes, to a chlorine content of from about 56% to about 74% chlorine and a hydrocarbon solvent insecticidal adjuvant as a carrier therefor.

4. An insecticidal composition comprising the product obtained by chlorination of bornyl chloride with chlorine gas at an elevated temperature, below the temperature at which the product decomposes, to a chlorine content of from about 56% to about 74% chlorine and a solid insecticidal adjuvant as a carrier therefor.

5. An insecticidal composition comprising an aqueous insecticidal dispersion of the product obtained by the chlorination of bornyl chloride with chlorine gas at an elevated temperature, below the temperature at which the product decomposes, to a chlorine content of from about 56% to about 74% chlorine.

6. An insecticidal composition comprising the product obtained by chlorination of bornyl chloride with chlorine gas at an elevated temperature, below the temperature at which the product decomposes, to a chlorine content of from about 60% to about 72% chlorine and a hydrocarbon solvent insecticidal adjuvant as a carrier therefor.

7. An insecticidal composition comprising the product obtained by chlorination of bornyl chloride with chlorine gas at an elevated temperature, below the temperature at which the product decomposes, to a chlorine content of from about 60% to about 72% chlorine and a solid insecticidal adjuvant as a carrier therefor.

8. An insecticidal composition comprising an aqueous insecticidal dispersion of the product obtained by the chlorination of bornyl chloride with chlorine gas at an elevated temperature, below the temperature at which the product decomposes, to a chlorine content of from about 60% to about 72% chlorine.

GEORGE ALLEN BUNTIN.

REFERENCES CITED

The following references are of record in the file of this patent:

UNITED STATES PATENTS

| Number | Name | Date |
|---|---|---|
| 1,366,106 | Weeks | Jan. 18, 1921 |
| 2,010,841 | Bender | Aug. 13, 1935 |
| 2,337,043 | Hasselstrom et al. | Dec. 21, 1943 |

OTHER REFERENCES

Roark: "A Second Index of Patented Mothproofing Materials," U. S. D. A. Bureau of Chemistry and Soils, Insecticide Division, February 1933, p. 84. 167-37.

Simonsen: "The Terpenes," vol II, pp. 142, 143 and page 281.

Desalbres et al.: Chimie & Industrie, vol. 58, pp. 443-448 (1947), thru Chem. Abst., vol. 42, p. 2719 (1948).

Frankforter: J. Am. Chem. Soc., vol. 28, pp. 1461-1465 (1906).

Simonsen: "The Terpenes," vol. II, pp. 140, 221 (1932).